(No Model.)
F. ANTAL.
APPARATUS FOR WARMING WINE WITHOUT BRINGING IT IN CONTACT WITH ATMOSPHERIC AIR.
No. 314,773. Patented Mar. 31, 1885.
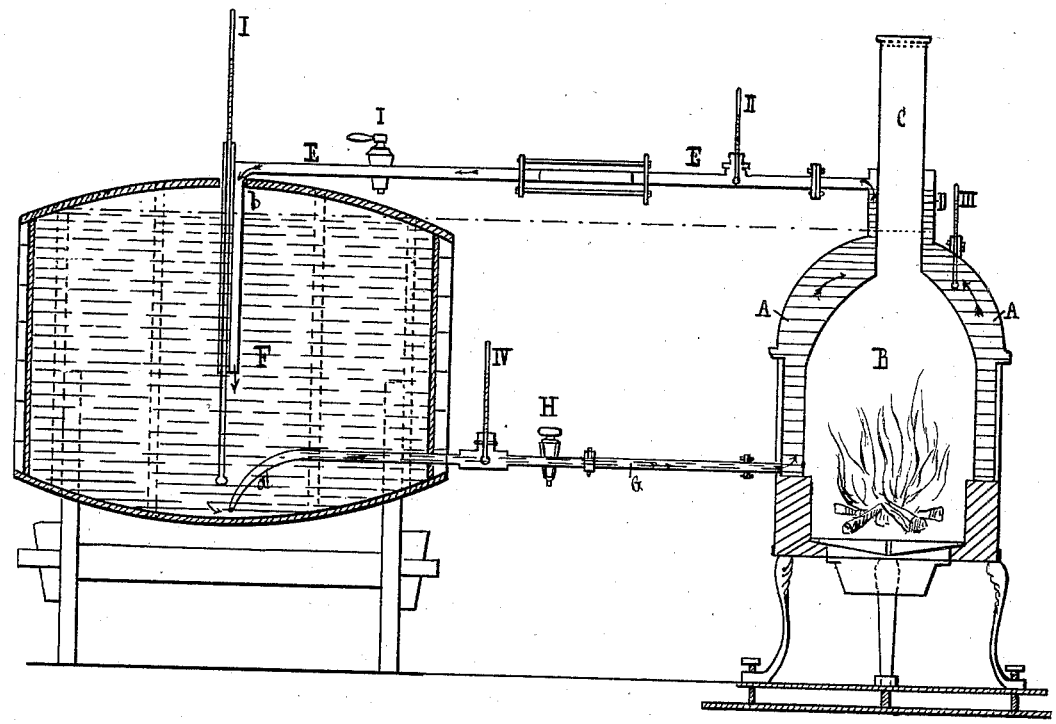
Witnesses
William Miller
J. A. Rutherford
Inventor
Fromm Antal
By Van Santvoord & Hauff
his atty's

UNITED STATES PATENT OFFICE.

FROMM ANTAL, OF BUDA-PESTH, AUSTRIA-HUNGARY.

APPARATUS FOR WARMING WINE WITHOUT BRINGING IT IN CONTACT WITH ATMOSPHERIC AIR.

SPECIFICATION forming part of Letters Patent No. 314,773, dated March 31, 1885.

Application filed October 10, 1883. (No model.) Patented in France July 2, 1883, No. 156,335.

*To all whom it may concern:*

Be it known that I, FROMM ANTAL, a citizen of Austria, residing at Buda-Pesth, Austria-Hungary, have invented new and useful Improvements in Apparatus for Warming Wine without Bringing it into Contact with the Atmospheric Air, (for which I have received Letters Patent in France, No. 156,335, dated July 2, 1883,) of which the following is a specification.

My invention relates to applying to the treatment of wines in large quantities the principles laid down by Pasteur for giving them more body, aging them more quickly, and fitting them for shipment abroad by heating them without bringing them into contact with the atmospheric air in the same casks or recipients in which they are to be kept or shipped, and without putting them into any other vessel even afterward. This end is attained by means of the apparatus hereinafter described, and illustrated in the accompanying drawing, which represents a longitudinal vertical section.

This apparatus consists substantially of a copper boiler, A A, tinned inside, with double walls, and of annular form, so as to surround a fire-place, B, the chimney C of which passes through the upper part, which is dome-shaped, terminated by an annular space, D. The upper part of the boiler is put in communication by a pipe, E, with the upper part of the cask F, which is quite full of wine, the lower part of the boiler being put in communication at the same time with the lower part of the cask F by a pipe, G. The tap H of the pipe G being open, the wine flows from the cask F into the boiler A after the key of the tap I of the pipe E has been removed to allow the air to escape from the boiler. The hydrostatic equilibrium will thus be established by the liquid reaching the same level in both vessels. The key of the tap I is then replaced and the fire lighted in the fire-place. The wine in the boiler being thus warmed, its specific weight diminishes and its volume increases in the following proportions: The difference in the volume of water at 1° centigrade and at 100°— *i. e.*, the boiling-point—is 4.5 per cent., and the difference in volume of alcohol of the same temperatures is ten per cent. Thus wine consisting, as it does, of about ninety per cent. of water and ten per cent. of alcohol, its coefficient would be $\frac{90 \times 4.5 + 10 \times 10}{100} = 5.05$. The temperature of wine in a cellar being about 10° centigrade, if it is heated and brought up to 60° centigrade, its volume by this increase of temperature of 50° centigrade will be increased by two and one-half per cent.; consequently the specific weight of the wine in the boiler A will be two and one-half per cent. less than the wine in the cask; and, according to the laws of physics, the levels of the two vessels A and F above the point of contact of the liquids in the two vessels or holders must be in inverse ratio to the specific weights of these liquids. Now, the point of contact being in the cask F at the curved end *a* of the pipe G, if the height in the cask from *a* to *b* is one meter, the level of the liquid in the boiler A must, after heating from 10° to 60° centigrade, reach one meter two and one-half centimeters for the hydrostatic equilibrium to be restored. But the upper opening, *c*, of the boiler connected with the bung-hole of the cask by the pipe E is cut through in the annular space D at such a height that as the heating commences and the volume of liquid in the boiler increases the liquid will flow from the boiler A into the cask F by the pipe E. The equilibrium will then be doubly disturbed, the volume in A being diminished and that in F being increased; consequently to restore this equilibrium a continuous current under a pressure of two and one-half centimeters in height will take place from F to A by the pipe G so long as the heat is not increased beyond 60° centigrade. The degree of temperature of the liquid in its course is regulated by thermometers I, II, III, IV, applied in any convenient manner. This technically practical mode of heating with a naked fire in a closed vessel, which is only possible by a continuous circulation, as also this spontaneous and automatic circulation obtained by a hydrostatic pressure, are quite new, the idea even of such an application not being found in the works of either Pasteur, Muspratt, or Dingler, or in any other work.

What I claim as new, and desire to secure by Letters Patent, is—

1. In an apparatus for heating wines and liquors, the combination of a heater having a chamber for the circulation of a fluid, a cask or reservoir, a pipe connecting the lower parts of the reservoir and the chamber of the heater, a pipe connecting their upper parts and attached to the heating-chamber at a point above the normal line of the liquid, the cask or reservoir and pipes being detachable from each other, whereby an automatic circulation of the liquid to be treated may be effected by the expansion of the liquid and the reservoir and its contents treated and removed without exposure to the air, substantially as described.

2. In an apparatus for heating wines or liquors, the combination of a heater provided with a chamber for heating the liquid, an inlet-pipe connected to the bottom thereof, an egress-pipe connected to the top thereof above the intended normal line of the liquid, the pipes being adapted to be attached to a cask or reservoir, whereby the contents of the latter may be heated without exposure to the air and an automatic circulation of the liquid during its treatment be caused by its own expansion, substantially as described.

FROMM ANTAL.

Witnesses:
HOLLING TSENING,
FLORIS ENDRE.